(12) United States Patent
Hazenbroek et al.

(10) Patent No.: US 10,765,122 B2
(45) Date of Patent: Sep. 8, 2020

(54) METHOD AND APPARATUS FOR PROCESSING POULTRY PARTS MOVING IN SUCCESSION ALONG A PATH

(71) Applicant: Foodmate B.V., Numansdorp (NL)

(72) Inventors: Jacobus Eliza Hazenbroek, Klaaswaal (NL); Maarten Jeroen van der End, Dordrecht (NL)

(73) Assignee: Foodmate B.V., Numansdorp (NL)

( * ) Notice: Subject to any disclaimer, the term of this patent is extended or adjusted under 35 U.S.C. 154(b) by 0 days.

(21) Appl. No.: 16/343,600

(22) PCT Filed: Nov. 14, 2017

(86) PCT No.: PCT/NL2017/050734
§ 371 (c)(1),
(2) Date: Apr. 19, 2019

(87) PCT Pub. No.: WO2018/093250
PCT Pub. Date: May 24, 2018

(65) Prior Publication Data
US 2020/0060298 A1     Feb. 27, 2020

(30) Foreign Application Priority Data

Nov. 15, 2016   (NL) .................................... 2017792

(51) Int. Cl.
*A22C 21/00*     (2006.01)
*B65G 47/84*     (2006.01)
*B65G 47/28*     (2006.01)

(52) U.S. Cl.
CPC ........ *A22C 21/0053* (2013.01); *B65G 47/844* (2013.01); *A22C 21/003* (2013.01);
(Continued)

(58) Field of Classification Search
CPC .......................... A22C 21/00; A22C 21/0053
(Continued)

(56) References Cited

U.S. PATENT DOCUMENTS 5,057,055 A * 10/1991 Michaud .............. A22C 11/008
452/182
5,896,809 A * 4/1999 Miller .................. A22C 15/001
414/240
(Continued)

FOREIGN PATENT DOCUMENTS

| CA | 954 660 A | 9/1974 |
|---|---|---|
| EP | 1 134 172 A1 | 9/2001 |
| KR | 1020100070473 | 6/2010 |
| KR | 1020140018252 | 2/2014 |
| KR | 1020160079819 | 7/2016 |

OTHER PUBLICATIONS

International Search Report in PCT/NL2017/050734 dated Feb. 5, 2018.

*Primary Examiner* — Richard T Price, Jr.
(74) *Attorney, Agent, or Firm* — Womble Bond Dickinson (US) LLP

(57) ABSTRACT

Method and apparatus for processing poultry parts moving in succession along a path of conveyance. The method provides for an apparatus (1) including at least a conveyor (5) arranged to convey a succession of poultry parts along the path of conveyance downstream of a loading area. The method further includes the step of loading the poultry parts on the conveyor (5) in the loading area, while operating the conveyor to convey the poultry parts in succession. Further the apparatus provided by the method also includes a transfer means (57) in the path of conveyance downstream of the loading area. The transfer means (57) is operated to divide the succession of poultry parts into at least two parallel streams. When coincident with the at least two parallel streams the method performs at least two processing steps in a side-by-side arrangement at a location downstream (Continued)

along the path of conveyance. The processing steps thereby being effective to process each poultry part either identically or differently, while these are divided into the at least two parallel streams of conveyance.

29 Claims, 18 Drawing Sheets

(52) U.S. Cl.
CPC .......... *A22C 21/0069* (2013.01); *B65G 47/28* (2013.01); *B65G 2207/36* (2013.01)

(58) Field of Classification Search
USPC .............................. 452/52, 53, 177, 182–184
See application file for complete search history.

(56) References Cited

U.S. PATENT DOCUMENTS

| | | | |
|---|---|---|---|
| 5,927,465 A | 7/1999 | Shearer, Jr. | |
| 6,692,345 B1* | 2/2004 | Kruger | A22B 5/0029 452/134 |
| 7,252,584 B2* | 8/2007 | Kragh | A22C 25/08 452/163 |
| 7,467,996 B1* | 12/2008 | Jager | A22C 17/0093 452/177 |
| 7,798,890 B2* | 9/2010 | Gerrits | A01K 45/005 452/53 |
| 2004/0077302 A1* | 4/2004 | Nielsen | A22C 21/0053 452/177 |
| 2010/0029187 A1* | 2/2010 | Haucke | A22C 17/008 452/184 |
| 2015/0017896 A1* | 1/2015 | Aandewiel | A22C 21/0053 452/177 |

* cited by examiner

METHOD AND APPARATUS FOR PROCESSING POULTRY PARTS MOVING IN SUCCESSION ALONG A PATH

The invention relates to a novel method for processing meat products in a path of conveyance, and an improved conveying system for enabling the novel method of processing meat products.

In processing of meat products, such as the processing poultry parts there exists a continuing need for increased processing speeds, to retain efficiency and to satisfy the needs of an increasing world population. A common phenomenon of the trend towards increasing speed of meat processing is that of larger sized machines, and as a result occupation of more floor space. Not only is the so required floor space hard to find in existing operations, it also often results in investment and capital destruction because a move to larger premises cannot be postponed to such a time that the existing premises have returned their full investment. Also often the smaller meat processing operations loose this battle for increased efficiency, and have to close down or worse become a victim of bankruptcy. Whereas increased meat processing efficiency does serve a general interest, a loss of employment by meat processing operations going out of business clearly does not.

Accordingly it is an object of the present invention to propose improved meat processing process and equipment that eliminates the known drawbacks. More in particular an improved conveying method and apparatus for incorporation into meat processing process and equipment. In a more general sense it is thus an object of the invention to overcome or reduce at least one of the disadvantages of the prior art. It is also an object of the present invention to provide alternative solutions which are less cumbersome in assembly and operation and which moreover can be made relatively inexpensively. Optionally it is an object of the invention to at least provide a useful alternative.

To this end the invention provides for a method and apparatus as defined in one or more of the appended claims. In particular the invention relates to a method for processing poultry parts moving in succession along a path of conveyance, providing a conveyor arranged to convey a succession of poultry parts along the path of conveyance downstream of a loading area, loading the poultry parts on the conveyor in the loading area, while operating the conveyor to convey the poultry parts in succession, providing a transfer means in the path of conveyance downstream of the loading area, operating the transfer means to divide the succession of poultry parts into at least two parallel streams, and performing at least two processing steps in a side-by-side arrangement at a location downstream along the path of conveyance coinciding with the at least two parallel streams, and effective to process each poultry part, while the poultry parts are divided into the at least two parallel streams. The arrangement of conveying and processing in parallel streams and duplication of the performing of processing steps allows increase of processing speed and throughput with little or no increase of floor space requirements. This clearly benefits existing meat processing plants, and avoids unnecessary investments in buildings and/or relocations.

In the method of the invention the conveyor can conveniently be provided as an endless conveyor. Alternatively or additionally the poultry parts can be supported by carriers being provided with the conveyor. Depending on the nature of the meat processing steps to be performed poultry carcasses are best suspended from shackles, while poultry breast caps for filleting are best supported on carriers as is known in the art. While the present invention is useful for breast cap filleting the principle of performing identical or different processing steps in a side-by-side arrangement along a path of conveyance in at least two parallel streams, can also be applied with the same benefits when harvesting meat from suspended articles of poultry.

Optionally the at least two processing steps can also be performed simultaneously, and/or the at least two processing steps can be identical for each divided stream. It is hence also possible to process the poultry parts in one parallel stream differently from the poultry parts in the other parallel stream. As a non-binding example either deskinning, or separating inner and outer fillets can be optional processing steps each applied to one stream, but not to the other.

The invention also relates to an apparatus for processing poultry parts moving in succession along a processing path, the apparatus comprising a conveyor defining the processing path and arranged to convey a succession of carriers for poultry parts along the processing path, a transfer mechanism arranged to divide the succession of poultry parts into at least two parallel streams, and downstream of the transfer mechanism either at least two identical or different processing units in a side-by-side arrangement or at least one single processing unit capable of processing poultry parts on at least two side-by-side carriers in the at least two parallel streams to process at least two poultry parts, while the poultry parts are distributed substantially equally over the at least two parallel streams.

Again the conveyor of such an apparatus can conveniently be in the form of an endless conveyor. A suitable form of conveyor, when the apparatus is arranged for breast cap filleting is an endless conveyor that defines an upper stretch and a lower stretch extending between first and second redirecting rollers.

The conveyor of the apparatus may also include a plurality of first and second carriers, each for supporting a poultry part. In a related embodiment each of the first and second carriers can have a base part for connection to the conveyor. Alternatively or additionally first carriers alternating with second carriers can be each arranged on successive pairs of first and second transverse bars that define chain links of the endless conveyor. In such an arrangement each base part conveniently can comprise first and second transverse bores for engaging the first and second transverse bars of each pair.

In an apparatus in accordance with the invention, the transfer mechanism can comprise a diagonal guide bar positioned for engagement by only the second carriers. In a related embodiment each of the second carriers can then have a projecting guide roller for engaging the diagonal guide bar.

In an embodiment of the invention in which the endless conveyor extends between opposite first and second redirecting rollers, at least one of the first and second redirecting rollers of the conveyor can be driven by a motor. Alternatively or additionally in such an endless conveyor embodiment at least one of the first and second redirecting rollers can comprise first and second lateral wheels. In one related embodiment the first and second lateral wheels can be mounted on a central shaft. In a further related embodiment, when alternating first and second carriers are each arranged on successive pairs of first and second transverse bars defining chain links of the endless conveyor, the first and second lateral wheels can be notched at their circumference to engage the pairs of first and second transverse bars defining the chain links of the conveyor. In yet another related embodiment, when the transfer mechanism comprises a diagonal guide bar positioned for engagement by only the second carriers, the diagonal guide bar can positioned between the first and second lateral wheels of at least one of the first and second redirecting rollers.

A particular embodiment of the conveying method and apparatus according to the invention can form part of a an apparatus for processing eviscerated poultry carcasses, such as for separating and removing fillets of meat from skeletal breast structures of chickens, turkeys or other birds. The apparatus then further includes meat processing stations for filleting poultry breast caps, and optionally at least one de-skinner unit downstream of the transfer mechanism. Such an apparatus may further also include one or more of a pair of identical wishbone removing units, a pair of identical first breast fillet removing units, a pair of identical breast fillet cutters, and/or a pair of identical second breast fillet removing units all downstream of the transfer mechanism, and each unit of a pair in a side-by-side arrangement with the other unit of the same pair. Units in each pair can optionally also be arranged for deactivation to skip one or more processing steps for the poultry parts conveyed in one of the at least two parallel streams. The machine for deboning and filleting breast caps can advantageous make use of an endless conveyor that defines an upper stretch and a lower stretch each extending between opposite first and second redirecting rollers. The upper stretch, or a part thereof, can then be used as a loading area. The lower stretch conveying the breast cap carriers in an upside-down position, downstream of the transfer mechanism, can then be used to locate the individual meat processing units. Thus allowing of loading the poultry parts in the loading area located in the upper stretch, while the conveyor is operated to convey the poultry parts in succession to the transfer mechanism.

In the loading area the carriers can have a closer and more compact spacing than in the processing area, the carrier spacing along a conveyor in conventional meat processing apparatuses is accordingly dictated by the processing units. The present invention as clarified by the examples given, allows the carrier spacing, and thereby the poultry part spacing to be adapted to the loading requirements, while at then same time allowing the spacing to be doubled for the processing units.

Further advantageous aspects of the invention will become clear from the appended description and in reference to the accompanying drawings, in which.

Figure 1:
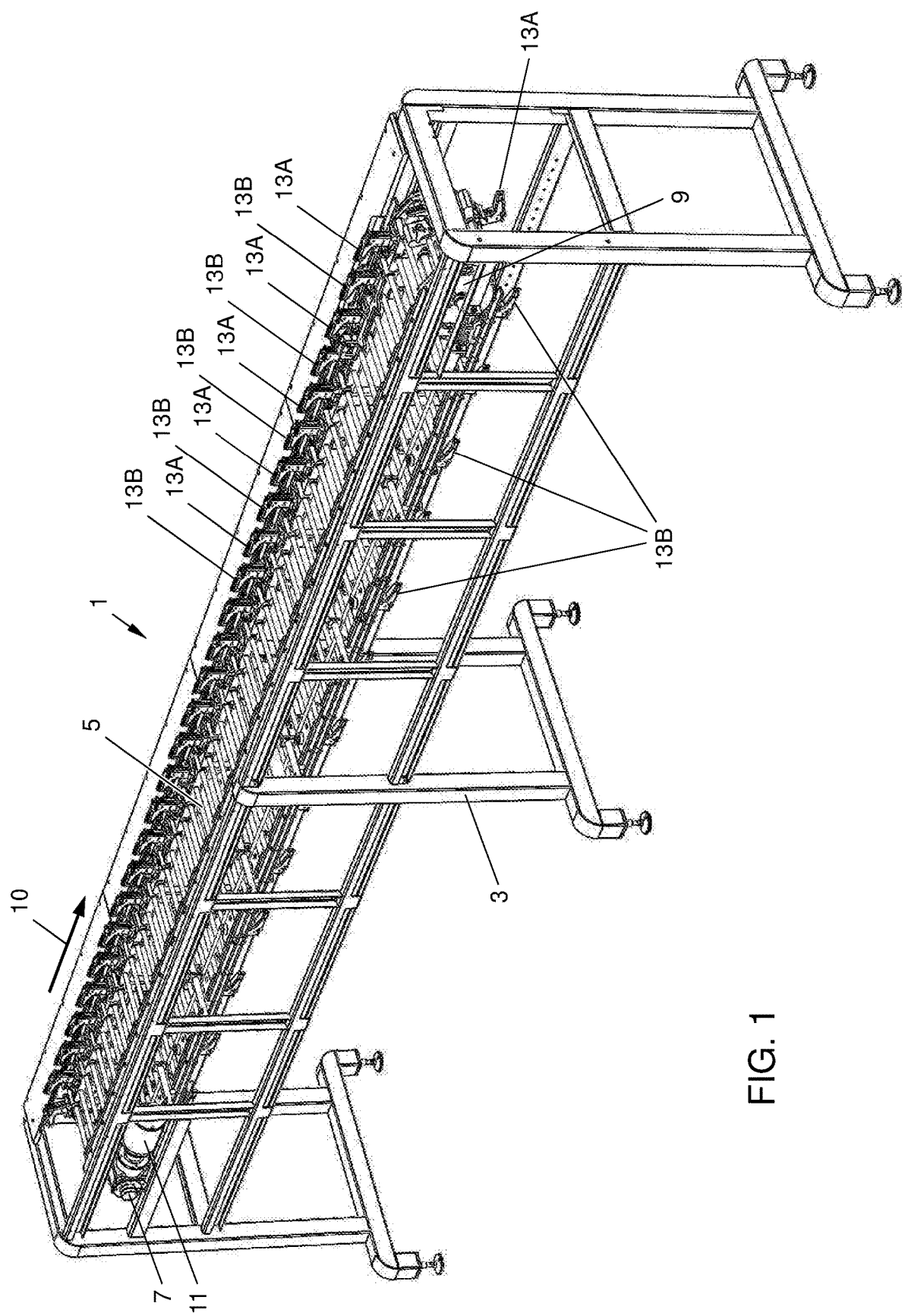
FIG. 1 is a meat processing machine having an endless conveyor in accordance with the present invention.

As shown in FIG. 1, a meat processing machine 1 has a support frame 3, and an endless conveyor 5. The endless conveyor 5 has a first redirecting roller 7, and a second redirecting roller 9, which are spaced from one another so as to cause the endless conveyor 5 to have parallel upper and lower stretches. It is to be understood that treatment stations can be provided along the lower stretch of the conveyor 5, but for clarity these have been omitted in FIG. 1. Associated with the first redirecting roller 7 is a drive motor 11, for moving the conveyor via the first redirecting roller 7 to define a path of conveyance in a direction of arrow 10 towards the second redirecting roller 9. Also shown in FIG. 1 is a plurality of individual carriers that are moved along with the conveyor 5. The individual carriers of the plurality of carriers are aligned along the upper parallel stretch of the conveyor as a cascade of interspersed substantially identical first and second carriers 13A, 13B. At the lower of the parallel conveyor stretches the first carriers 13A are seen to remain aligned on the same longitudinal side of the meat processing machine 1, while the second carriers 13B have moved to an opposite longitudinal side of the meat processing machine 1.

Figure 2:
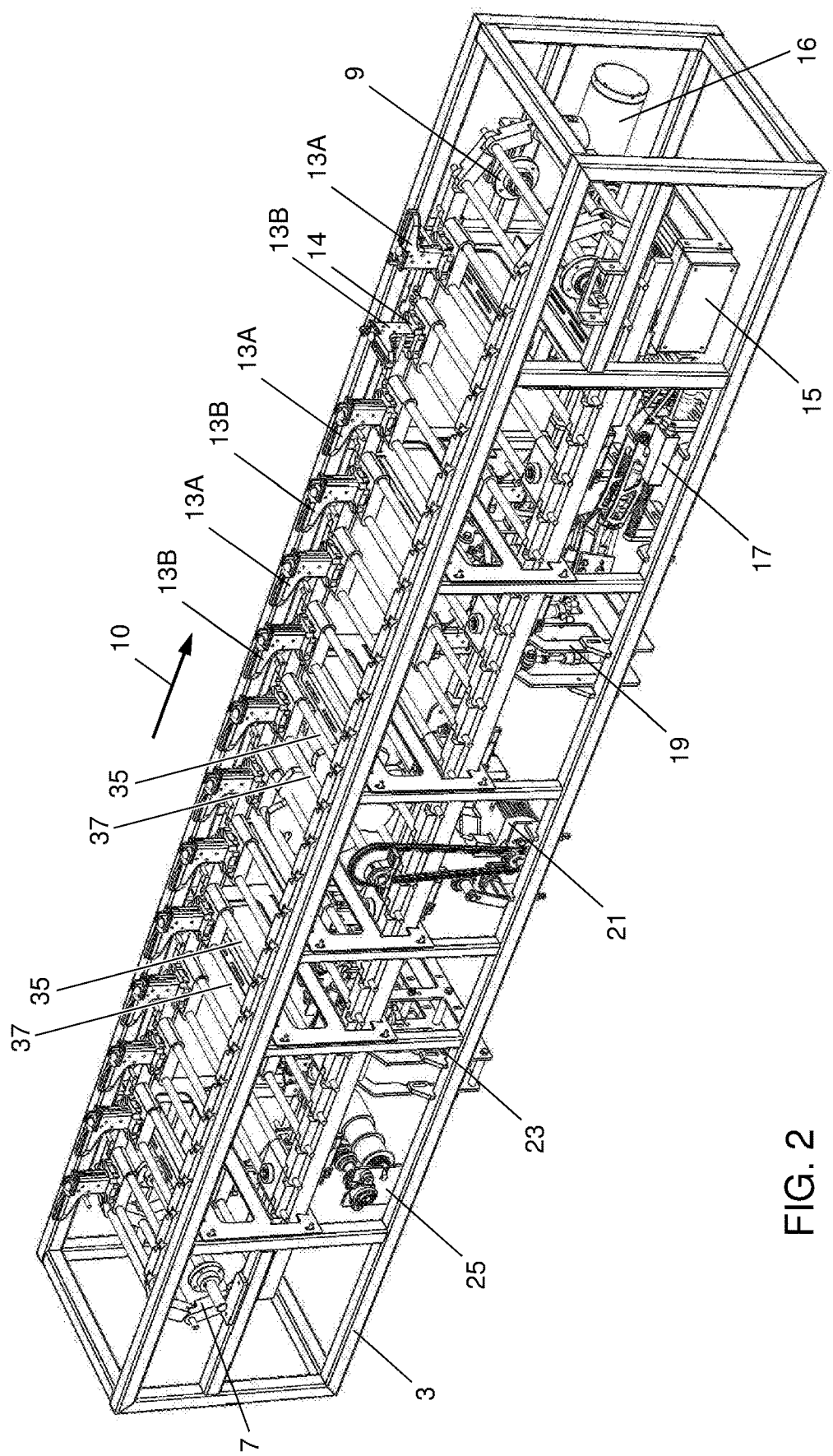
FIG. 2 is an exemplary embodiment of a meat processing machine with a conveyor or part in accordance with the invention with the addition or treatment stations.

FIG. 2 shows a meat processing machine similar to FIG. 1, but with the addition of a turning station 14, as well as a variety of meat processing stations 15, 17, 19, 21, 23, 25 along the lower parallel conveyor stretch. The turnings station 14, when passed by each of the first and second carriers 13A, 13B, causes mandrels mounted thereon to be rotated through 180 degrees, as shown in the right hand part of FIG. 2. The mandrels will be further described herein below and be referred to by a reference numeral 39. In an upstream to downstream direction of the conveyor movement a first meat processing station 15 is a de-skinner unit that is powered by a drive motor 16. This de-skinner is similar to that described in U.S. Pat. No. 9,078,453, but is wider to enable de-skinning of poultry breasts, suspended in parallel tracks from first and second carriers 13A, 13B. Next is a pair of second meat processing stations 17, which in this example is a pair of furcular or wishbone removers, which are arranged side by side. The furcular removers 17 can form part of a poultry breast filleting system, as described in co-pending Netherlands patent application NL 2015436. A next meat processing station is composed of a pair of side-by-side first breast fillet removing units 19. The first breast fillet removing units 19 are followed by a pair of identical breast fillet cutters 21, which each cut a breast cap held on a respective carrier 13A, 13B along its keel bone. The so cut breast caps are then conveyed towards a pair of side-by-side and identical second breast fillet removing units 23, where inner and outer breast fillets can be separated. A subsequent pair of side-by-side third fillet removing units 25 for removing the breast fillets from the carcasses.

Figure 3:
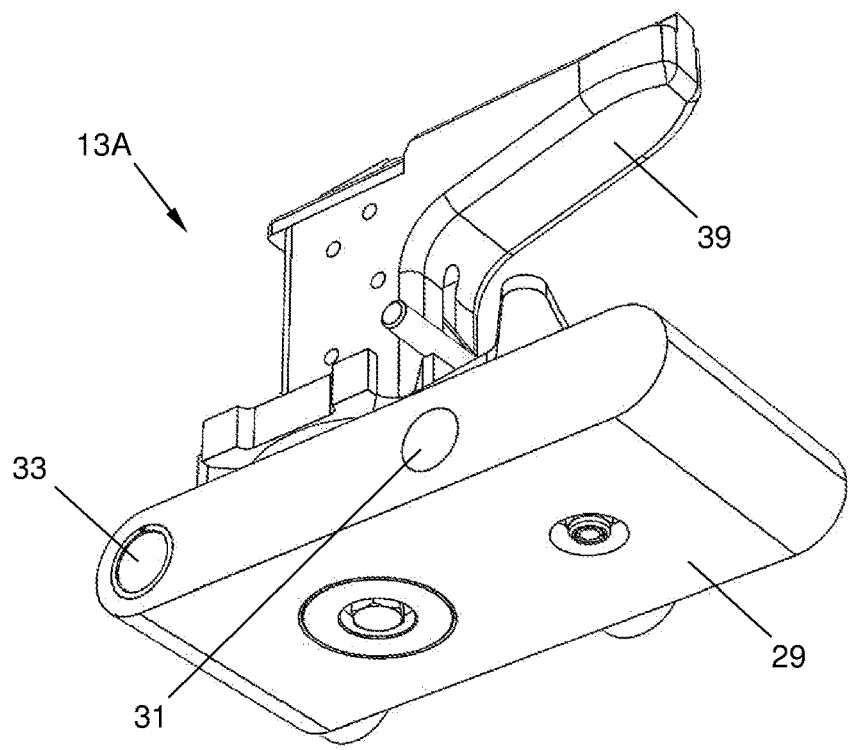
FIG. 3 is an isometric view of a first type of carrier that can be used with the present invention.
Figure 4:
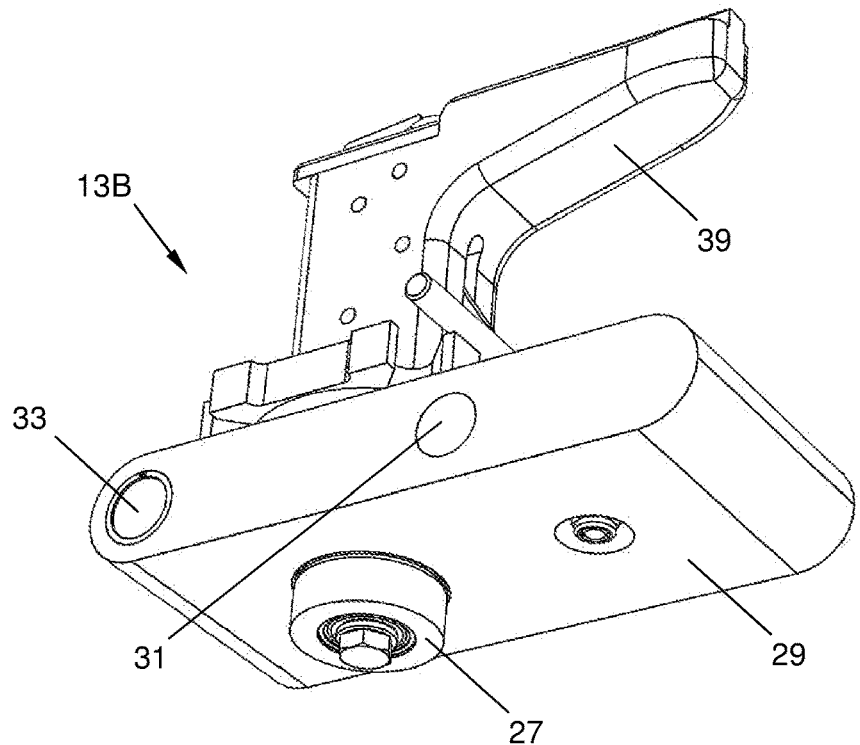
FIG. 4 is an isometric view of a second type of carrier that can be used with the present invention.

Referring to FIGS. 3 and 4 it is seen that the second carrier 13B shown in FIG. 4 differs slightly from the first carrier 13A shown in FIG. 3 by a roller 27 projecting form an inwardly directed side of a base part 29. The base part 29 is identical for each of the first and second carriers 13A, 13B and has first and second transverse bores 31, 33.

Figure 6:
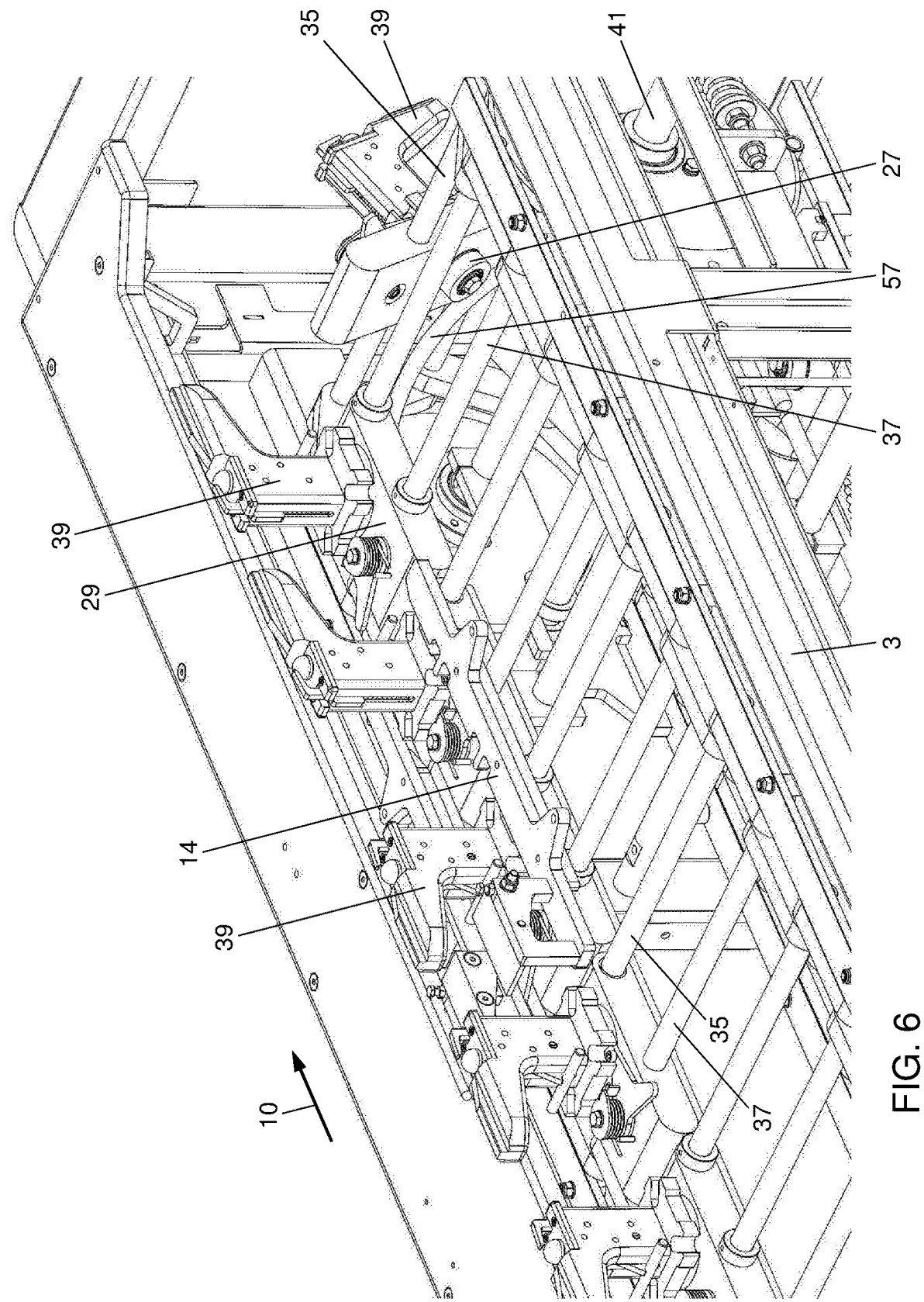
FIG. 6 is a perspective view of the conveyor of FIG. 1 at a redirecting end thereof.

In assembled condition of the meat processing machine 1 the base parts 29 of each of the first and second carriers 13A, 13B are laterally slideable on first and second transverse bars 35, 37 of each conveyor chain link of the endless conveyor 5, as best shown in FIGS. 2 and 6. The first transverse bore 31 thereby engaging the second transverse bar 37, and the second transverse bore 33 engaging the first transverse bar 35. Each first and second carrier 13A, 13B has a mandrel 39 extending from an outwardly directed surface of the base part 29. Each mandrel 39 may be rotatable with respect to the base part 29 about an axis extending orthogonally from the outwardly directed surface of the base part 29. A more detailed description of these mandrels 39 goes beyond the subject of the present invention and is thereby redundant.

Figure 5:
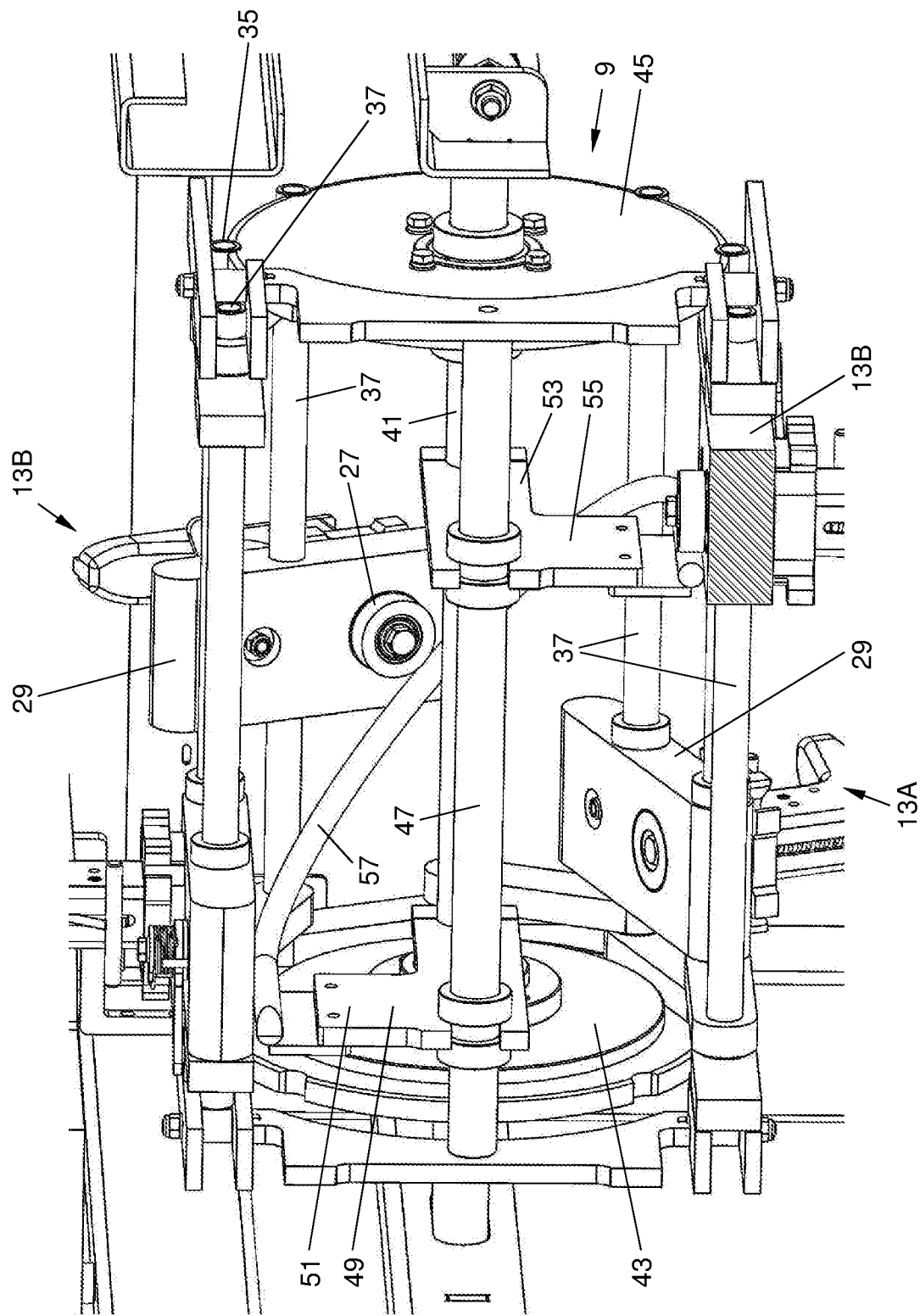
FIG. 5 is a perspective view from within the endless conveyor of a redirection roller.

As seen in FIG. 5, the second redirecting roller 9 is composed of a central shaft 41, and opposite lateral notched first and second lateral wheels 43, 45 for engaging the first and second transverse bars 35, 37 within circumferential notches. Parallel to the central shaft 41 is a stationary bar 47, which is attached to the support frame 3. A first L-shaped bracket 49 having an upwardly directed leg 51 is positioned adjacent the first lateral wheel 43 of the redirecting roller 9. A second L-shaped bracket 53 having a downwardly directed leg 55 is positioned closer to the second lateral wheel 45 of the redirecting roller 9. A diagonal guide bar 57 is attached to the upstanding leg 51 and the downwardly extending leg 55 of the respective first and second L-shaped brackets 49, 53 and extends there between to be held in a stationary position with respect to the redirecting roller 9.

As clearly seen in FIGS. 5 and 6 when the first and second carriers 13A, 13B together with the conveyor 5 pass over the redirecting roller 9, the roller 27 of each second carrier 13B engages the diagonal guide bar 57 and are taken out of the cascade of aligned carriers to form a separate cascade of only second carriers 13B on an opposite lateral side of the conveyor 5. During this transfer motion the second carriers 13B slide over the first and second transverse bars 35, 37 by means of their base parts 29. This enables poultry breast on each of the first and second carriers 13A, 13B to be quasi simultaneously processed by respective identical or different processing stations which are in a side-by-side or staggered relationship along the lower stretch of the endless conveyor 5.

By a similar arrangement, not shown, the first and second carriers 13A, 13B are realigned at the first redirecting roller 7 before returning to the upper stretch of the endless conveyor 5.

Also seen in FIG. 6 is the turning station 14, which reverses the mandrels 39 downstream of the turning station 14 in the direction of arrow 10. This reversed position of the mandrel 39 causes the poultry breast caps to be rotated through 180 degrees to be positioned for de-skinning. Other processing steps may require the mandrels to be rotated again differently, for which similar turning stations may additionally be provided along the path of conveyance. Such mechanisms are conventional, and do not require further explanation.

Figure 7A:
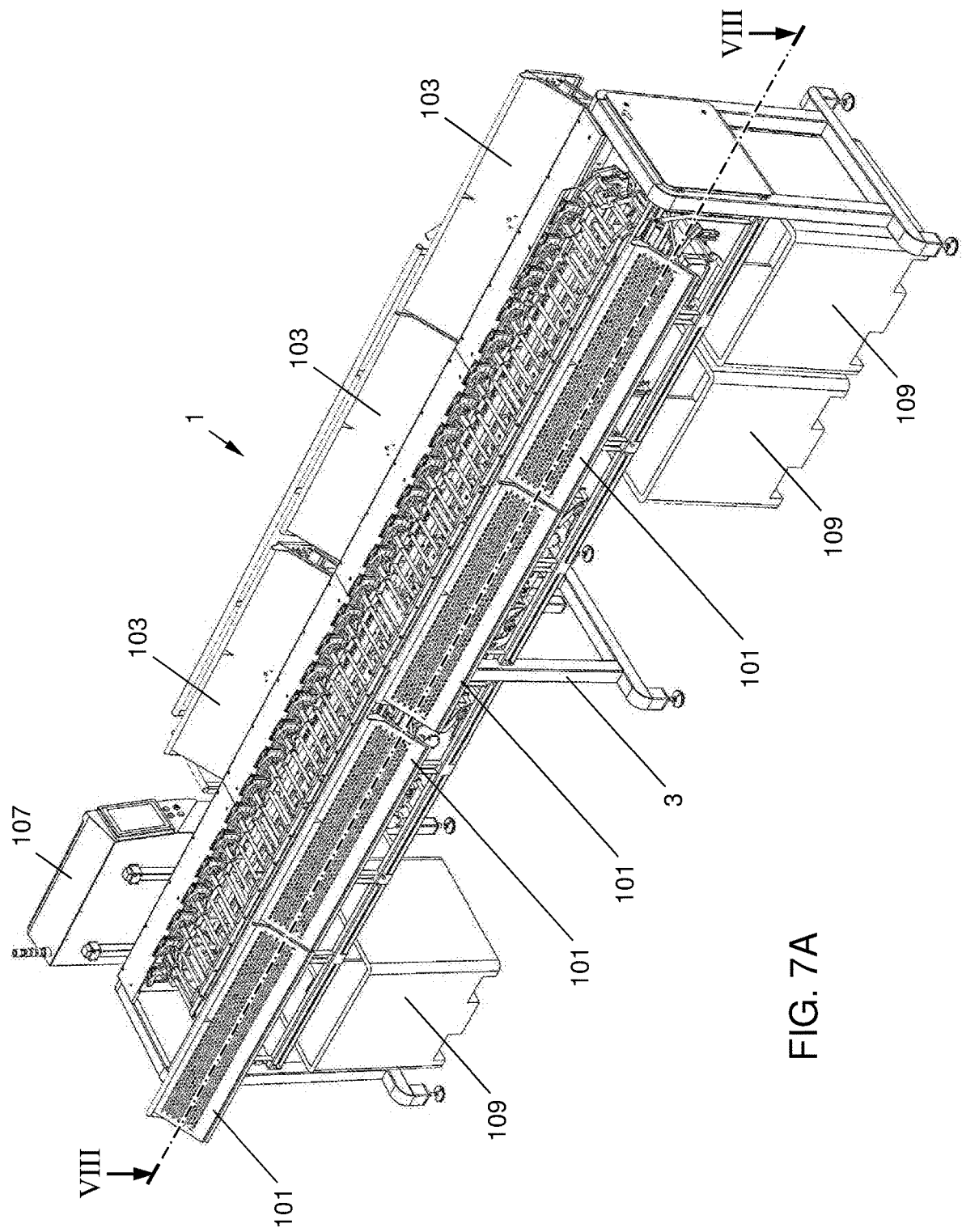
FIG. 7A illustrates the meat processing machine of FIG. 1 provided with safety hatches, which are shown in an open position.
Figure 7B:
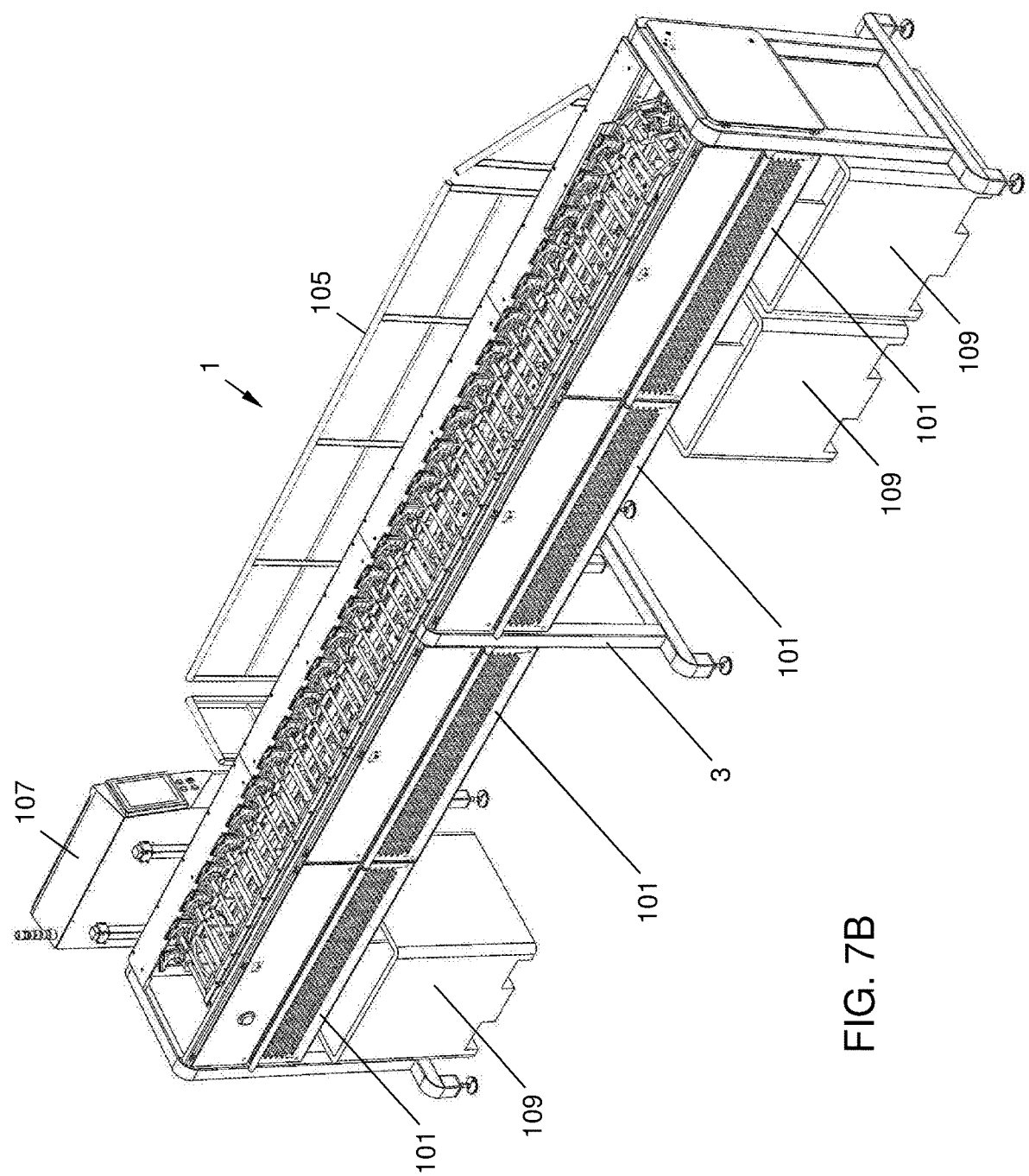
FIG. 7B is the meat processing machine of FIG. 7A with the safety hatches in their closed position.

The meat processing machine 1 as shown in FIG. 1 in simplified form to expose its endless conveyor, is now shown in full in FIGS. 7A and 7B. For reasons of safety the moving parts are shielded by safety hatches 101 and 103 on opposite sides of the machine. In FIG. 7A these safety hatches 101, 103 are shown in an opened position, and the machine 1 is conveniently arranged to be inoperative when any one of the safety hatches is not in a closed position. FIG. 7B shows all the hatches (only hatches 101 being visible) in their closed position. It is further visible in FIG. 7B that a loading platform is protected by a balustrade 105. The machine 1 as shown in FIGS. 7A and 7B is also provided with a control cabinet 107. Receiving containers 109 can be placed underneath the support frame 3 for receiving harvested meat or by-products of meat processing.

Figure 8A:
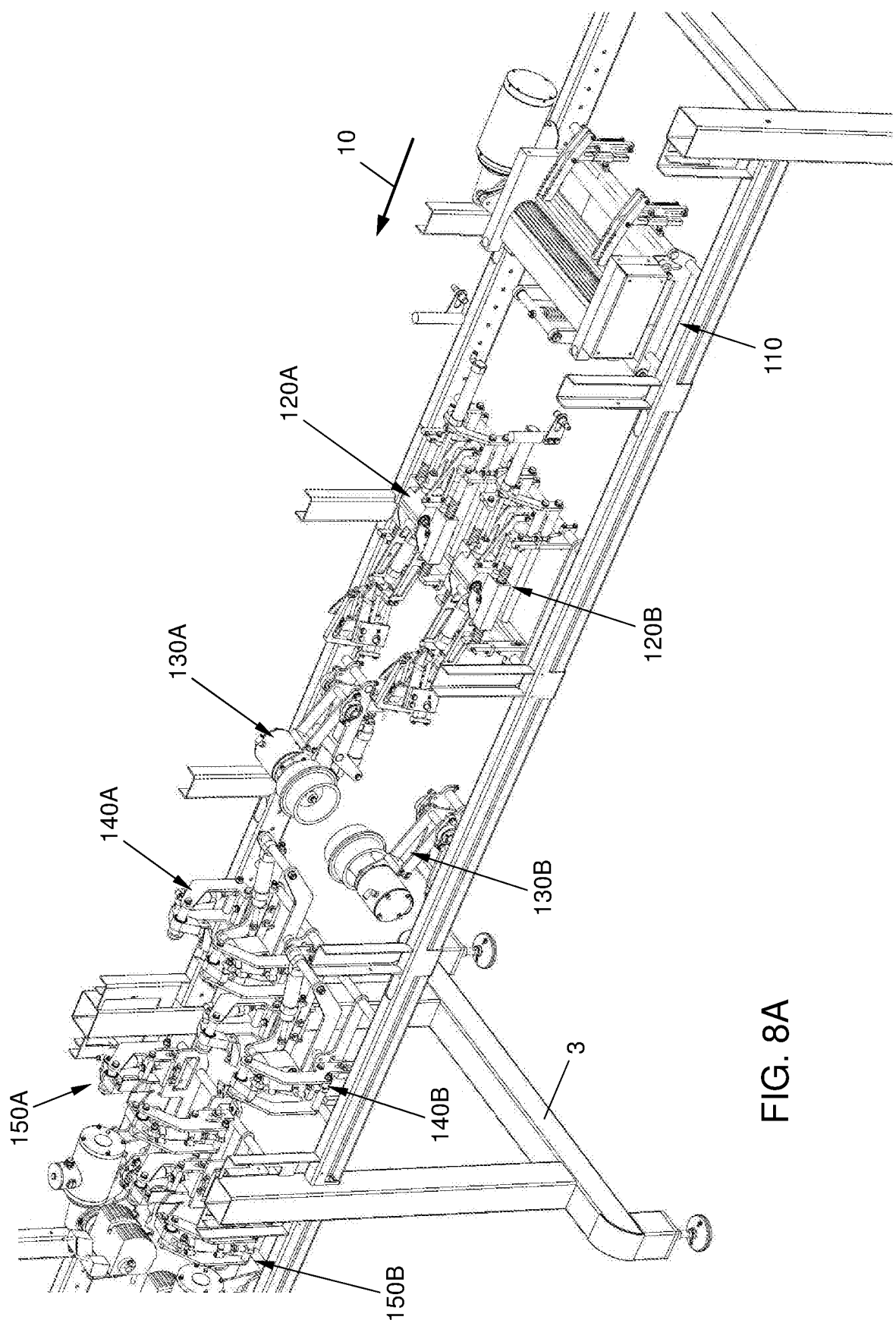
FIG. 8A is an upstream portion of a partial cross section along the line VIII-VIII of FIG. 7A.
Figure 8B:
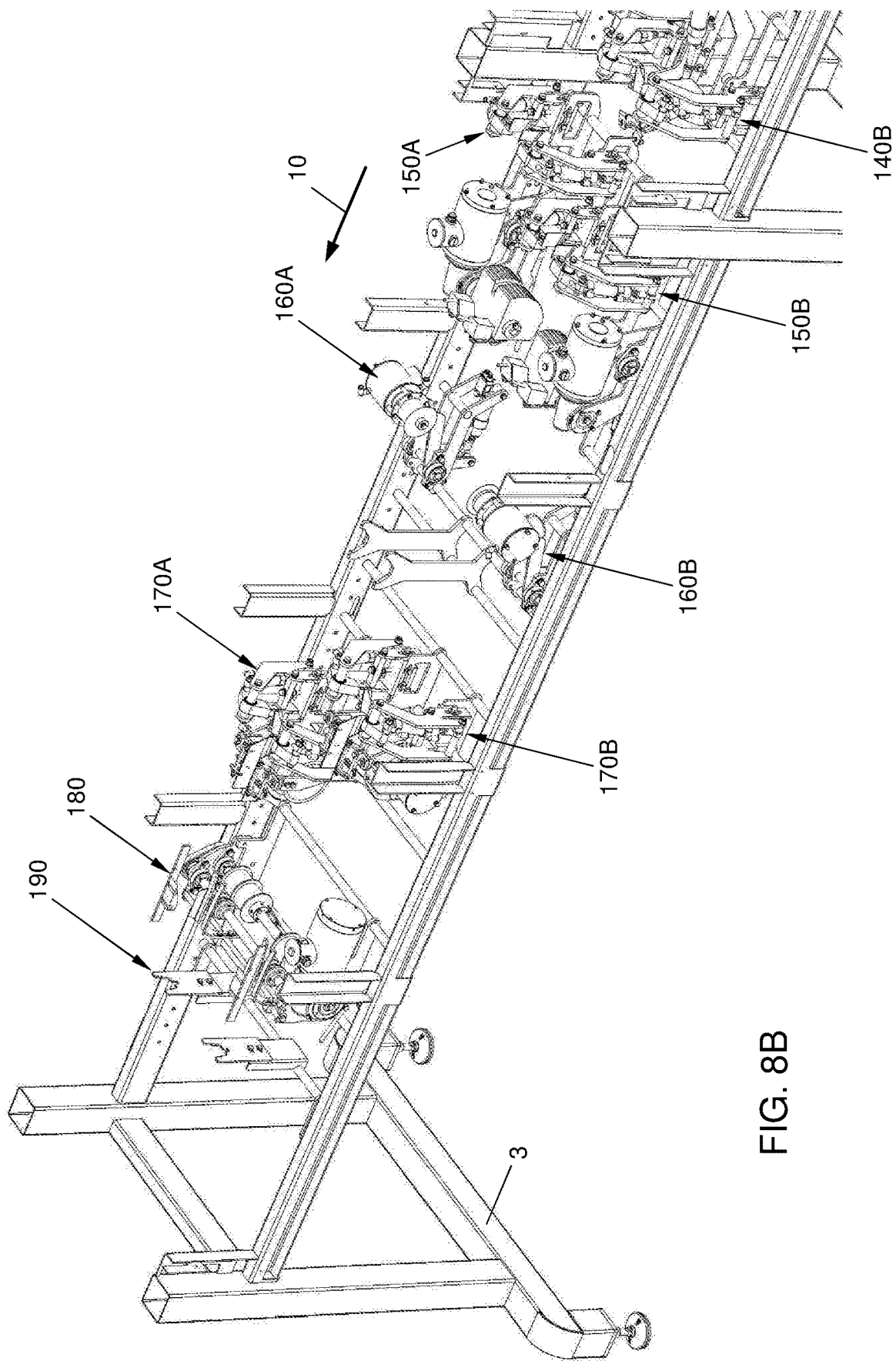
FIG. 8B is a downstream portion of the partial cross section along the line VIII-VIII of FIG. 7A.

As seen in the partial cross section, divided over FIGS. 8A and 8B as an upstream portion and a downstream portion respectively, the various meat processing units are shown without the endless conveyor hiding their view. The direction in which in this case the lower stretch of the conveyor is moving is again indicated by an arrow 10.

A double de-skinner unit 110 as shown in FIG. 8A acts as a first meat processing station. The de-skinner unit 110 is followed by a pair of wishbone removers 120A, 120B, which act as a second meat processing station. While the wishbone removers 120A, 120B are positioned side-by-side, they will nonetheless not be engaged simultaneously because the poultry parts to be processed in each parallel stream of the conveyor are staggered with respect to one another. Not simultaneously processing the poultry parts in each conveyor stream also has the advantage that the power consumption of each unit is spread in time. With the double de-skinner unit this has the advantage that it can use many components of its drive in common with a conventional single de-skinner unit. Following the wishbone removers 120A, 120B is a pair of breast splitter units 130A, 130B, each of which is a mirror image of the other. The breast splitter units 130A, 130B are then followed by a pair of staggered front cutters 140A, 140B. These front cutters 140A, 140B are staggered to economize on space requirement by permitting the spacing between the parallel conveyor streams to be as small as possible.

Reverting now to FIG. 8B, it is seen that the front cutters 140A, 140B are followed by a pair of staggered first harvesting units 150A, 150B, which act as a first breast fillet remover. The staggering of the front cutters 140A, 140B and of the first harvesting units 150A, 150B is not necessarily the same as the staggering of poultry parts, or poultry parts carriers in the parallel conveyor streams, but merely determined by space requirements within the machine frame 3. After passing the first fillet harvesting units 150A, 150B, a next meat processing station is formed by a pair of parallel tendon cutters 160A, 160B. From the tendon cutters 160A, 160B the poultry parts to be processed, in this example breast caps, are engaged by a pair of staggered second harvesting units 170A, 170B acting as second breast fillet removers. The second breast fillet harvesting units 170A, 170B are followed by a double third harvesting unit 180, acting as a breast fillet remover when whole breast fillets are to be harvested. As a final processing station the third breast fillet harvesting unit 180 is followed by a double carcass unloader 190.

FIGS. 9-17 show the various individual processing units detached from the machine and will be briefly described herein below.

Figure 9:
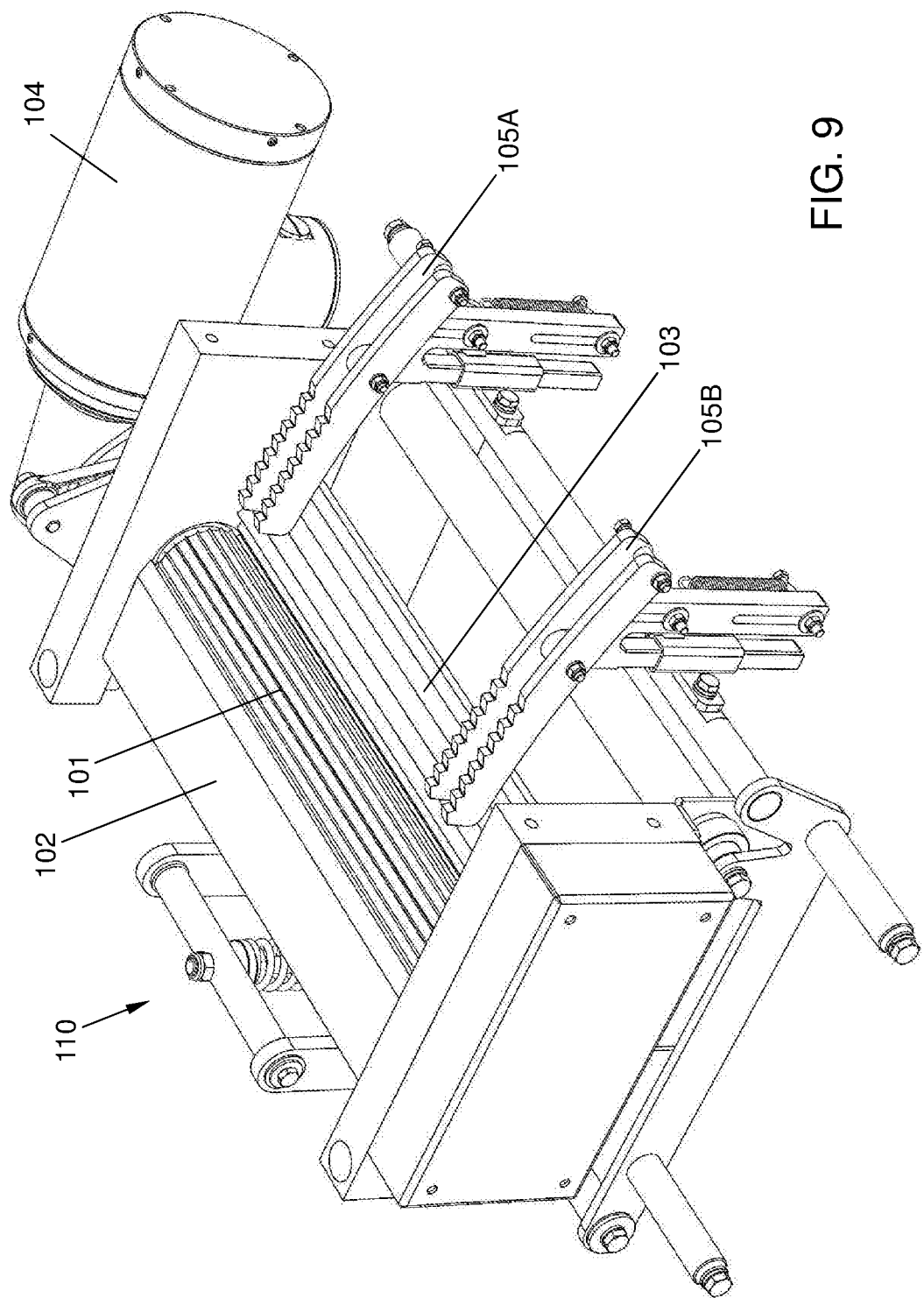
FIG. 9 is an isometric view of a double de-skinner unit.

The double de-skinner unit 110 as shown in FIG. 9 includes a gripper roller 101, a knife blade 102, and a cleaning roller 103 all driven by motor unit 104. This device is generally as described in U.S. Pat. No. 9,078,453, but differs in being somewhat wider, and by having a parallel pair of first and second guide cams 105A, 105B.

Figure 10:
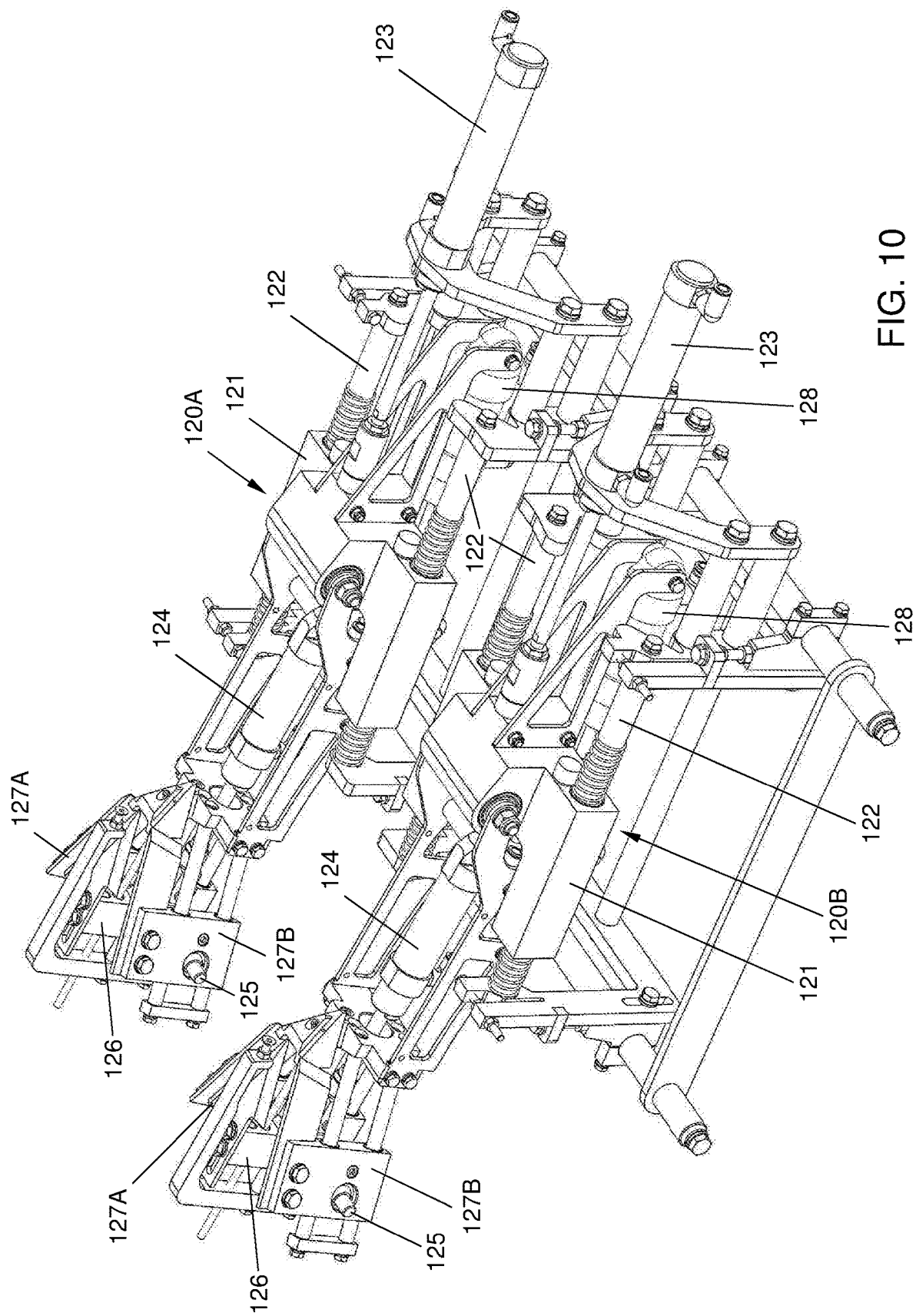
FIG. 10 is an isometric view of a pair of wishbone removers.

The pair of wishbone removers 120A, 120B as shown in FIG. 10 each comprise a carriage 121 slideably arranged on parallel guide bars 122. Each wishbone remover 120A, 120B having a first linear pneumatic actuator 123 for controlling parallel reciprocating movement of the carriage 121 along the guide bars 122. A second pneumatic linear actuator 124 via a connecting rod 125 moves a cutting element 126 and gripping elements 127A, 127B inwardly or outwardly along converging guide tracks. The cutting and gripping elements 126, 127A, 127B are pivotally mounted on the carriage 121 for being brought into and out of the path of the conveyed poultry parts by a further pneumatic actuator 128. Generally these wishbone removers 120A, 120B correspond to the unit described in co-pending application NL 2015436.

Figure 11:
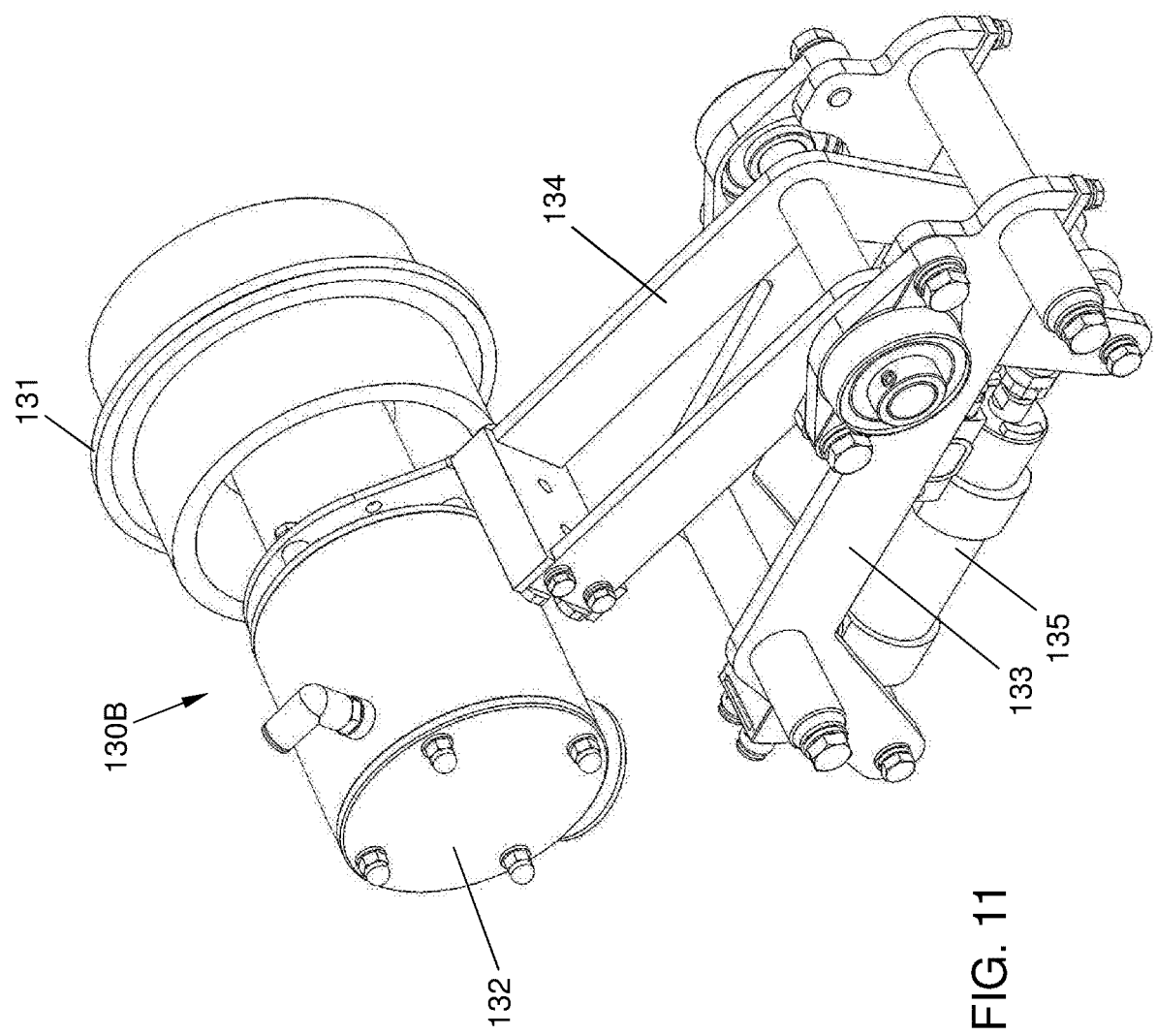
FIG. 11 is an isometric view of one exemplary breast splitter unit.

The breast cutter splitter 130B as shown in FIG. 11 comprises a circular double cutter blade 131, driven by a drive motor 132 for cutting along the keel bone of a poultry breast cap. The rotating cutter 131 and drive motor 132 are pivotally mounted from a sub-frame 133 by an arm 134 to be elevated into and out of contact with an inverted breast cap suspended from the overhead conveyor. Elevation of the arm 134 is controlled by a pneumatic actuator 135.

Figure 12:
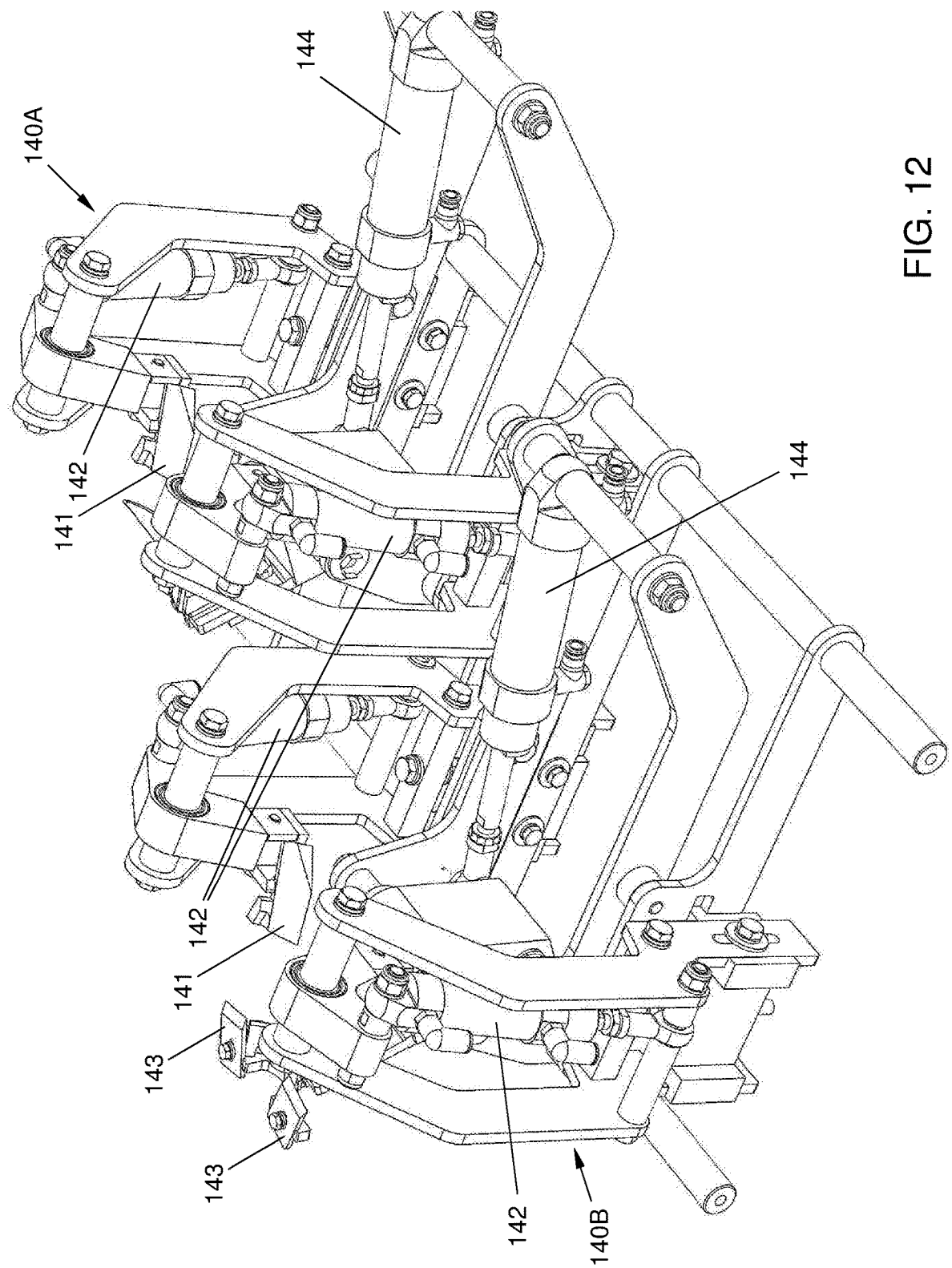
FIG. 12 is an isometric view of a pair of staggered front cutters.

The pair of staggered front cutters 140A, 140B as shown in FIG. 12 are each equipped with opposite centering guides 141 of which only one is visible. These centering guides 141 are movable inwardly and outwardly as controlled by pneumatic actuators 142. Tendon front cutting knifes 143 are movable in and out of the path of movement of a poultry part carrying mandrel, by movement of the pneumatic cylinders 144.

Figure 13:
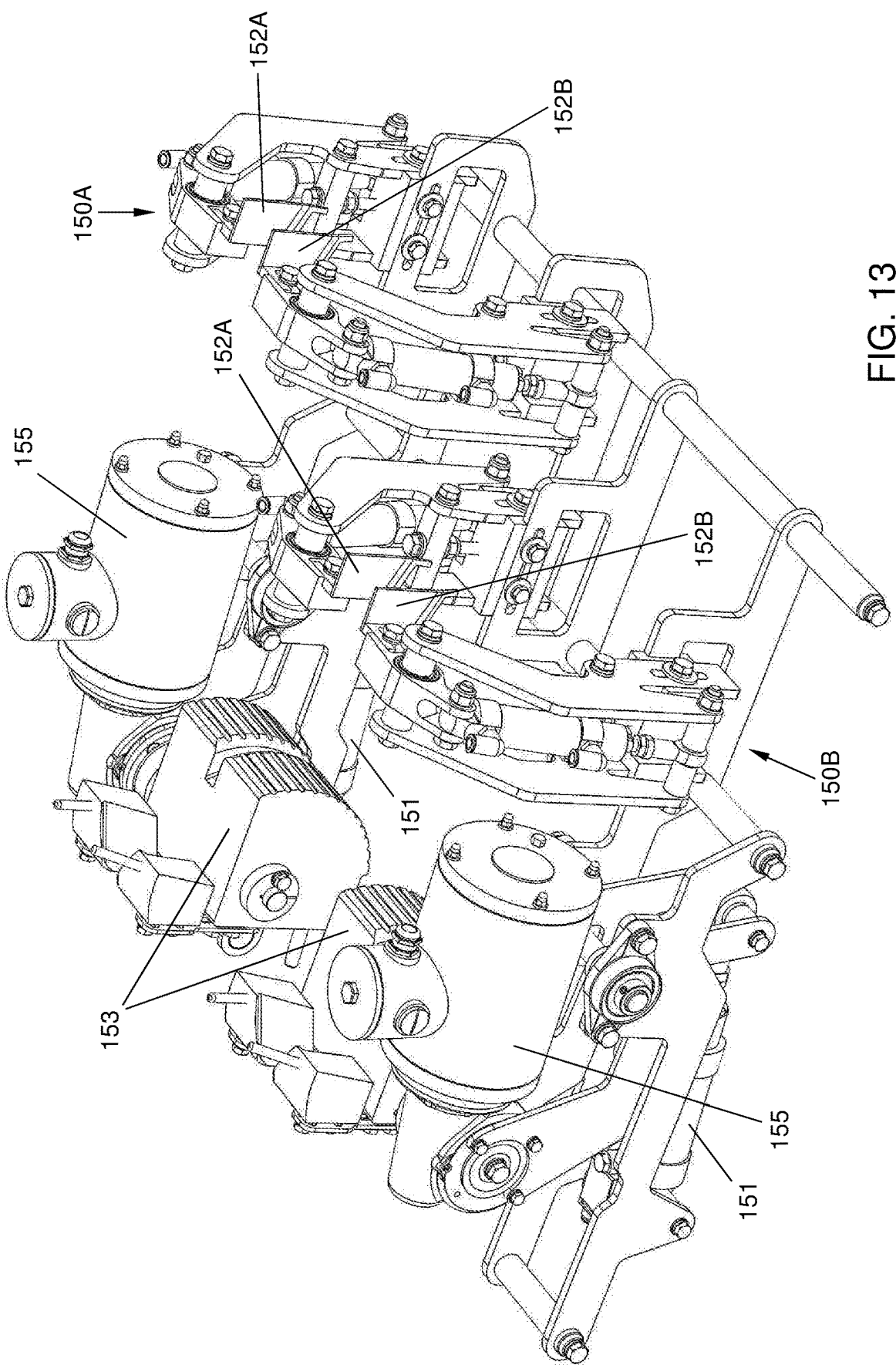
FIG. 13 is an isometric view of a pair of staggered first harvesting units.

As shown in FIG. 13 the pair of staggered first harvesting units 150A, 150B can be activated to be in the path of movement of the poultry breast cap, when an outer fillet is to be separately harvested. Movement in and out of the path of movement is accomplished by a pneumatic actuator 151. When controlled to be activated the poultry breast cap is first engaged by scraping blades 152A, 152B, which engage a breast cap between the inner and outer fillets. The harvesting of the outer fillet is then accomplished by outer fillet harvesting grippers 153, which are rotated by drive motors 155.

Figure 14:
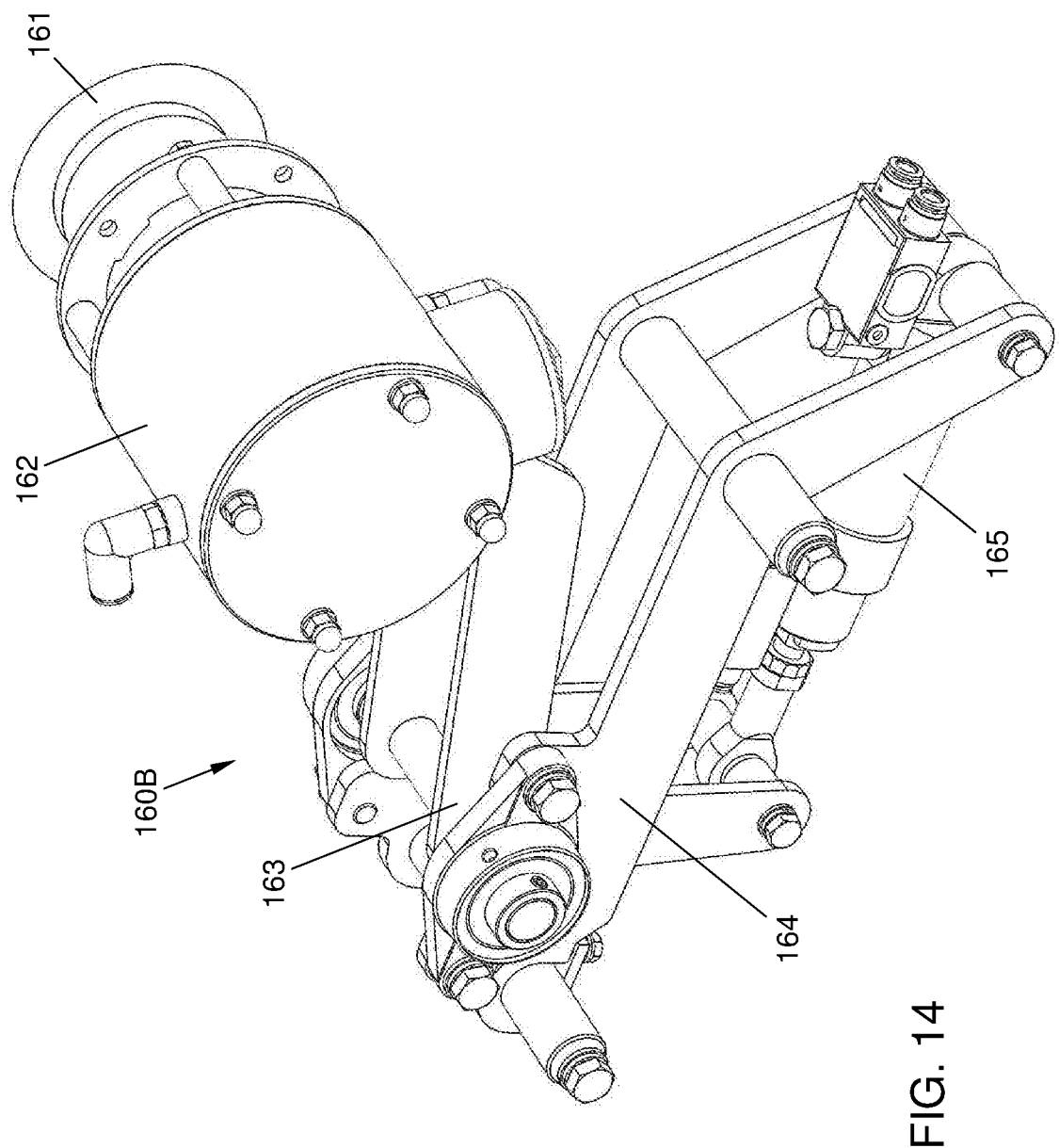
FIG. 14 is an isometric view of one exemplary tendon cutter.

Tendon cutter 160B, as shown in FIG. 14 includes a rotating circular knife 161 driven by a drive motor 162. Drive motor 162 is mounted on a pivotable arm 163, which is pivotably mounted on a sub-frame 164 and pivoted by pneumatic actuator 165 to be moved in and out of the breast cap conveying path as required.

Figure 15:
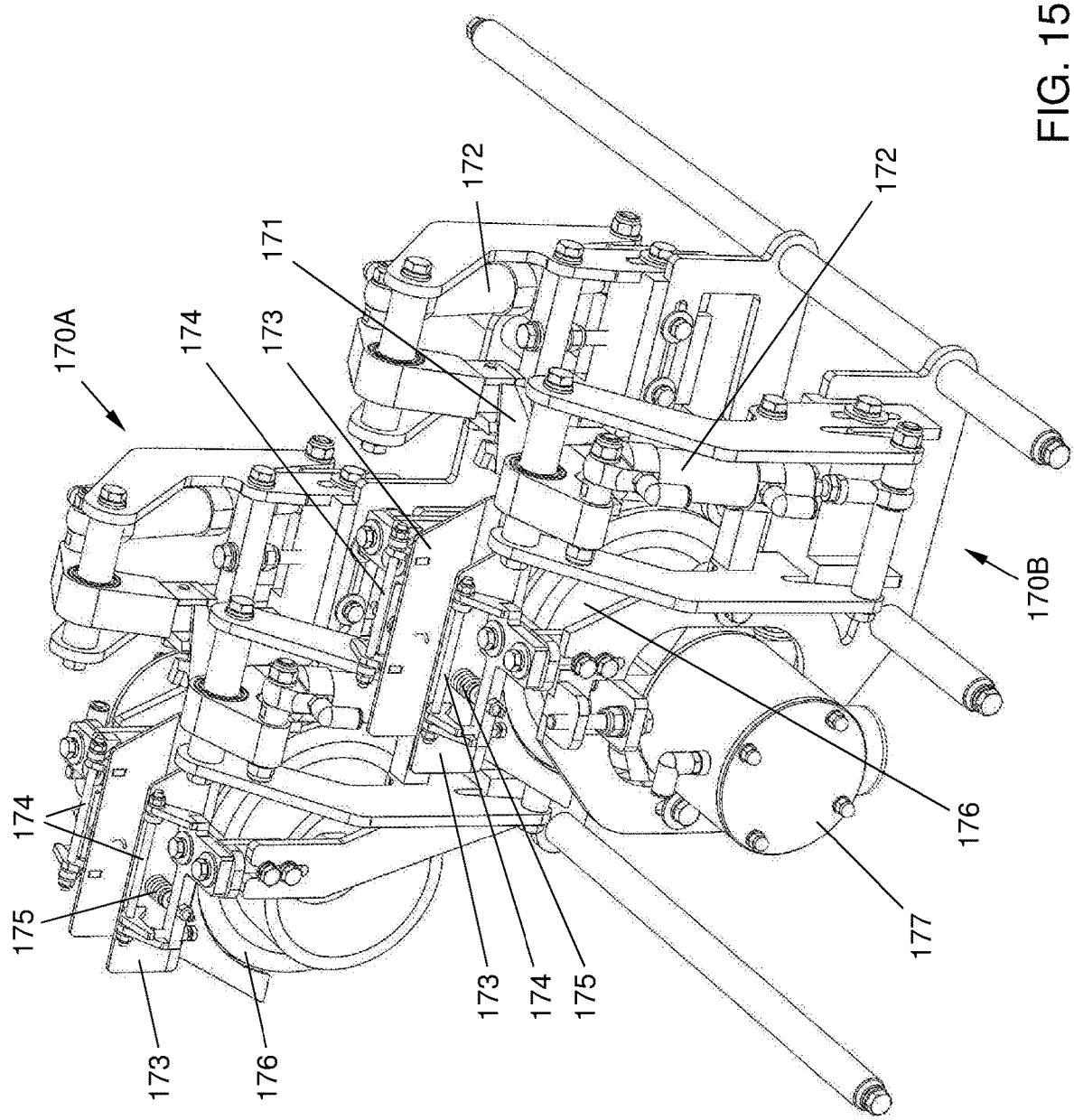
FIG. 15 is an isometric view of a pair of staggered second harvesting units.

As shown in FIG. 15 the pair of staggered second harvesting units 170A, 170B serves to harvest half breast fillets and inner fillets. The breast fillet is first engaged by opposite guide blocks 171, which can be moved inwardly and outwardly by pneumatic actuators 172. Engagement is then by opposite tunnel plates 173, which are each pivotally mounted from a shaft 174, and urged inwardly by a spring 175. Underneath the tunnel plates 173 is a rotary cutter 176 driven by a motor 177.

Figure 16:
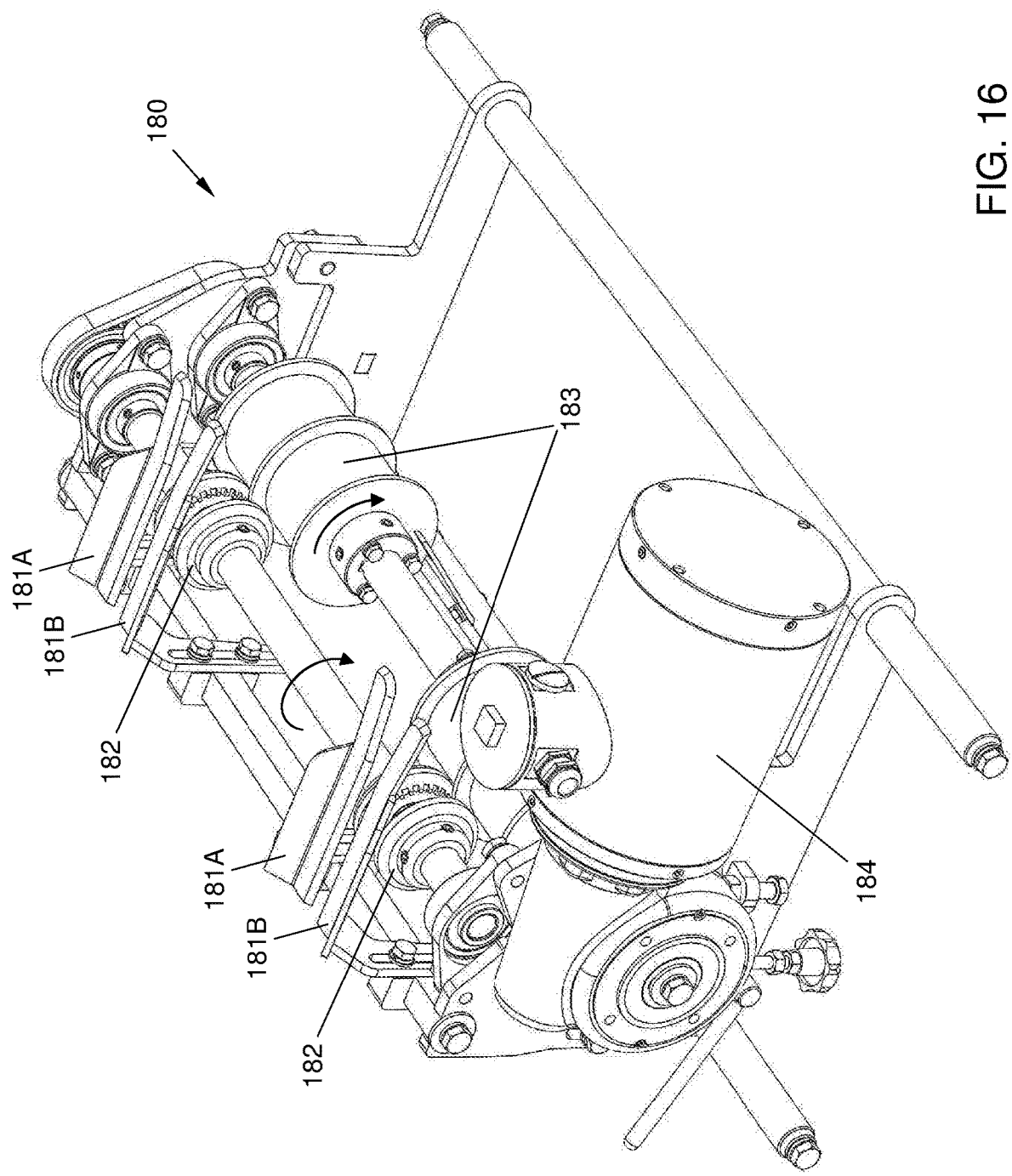
FIG. 16 is an isometric view of a double third harvesting unit.

The double third harvesting unit 180 as shown in FIG. 16 has carcass guides 181A, 181B for engaging between the carcass and any remaining meat. Underneath the carcass guides 181A, 181B are positioned first and second rollers 182, 183, which are rotated in the direction of the indicated arrows by a drive motor unit 184. This third harvesting unit 180 is effective to remove a whole breast cap fillet, when the first and second harvesting units 150A, 150B; 170A, 170B are deactivated. When the first and second harvesting units are activated the third harvesting unit 180 has no longer any effect and a meatless carcass will simply pass this unit, as there would no longer be any meat left to harvest.

Figure 17:
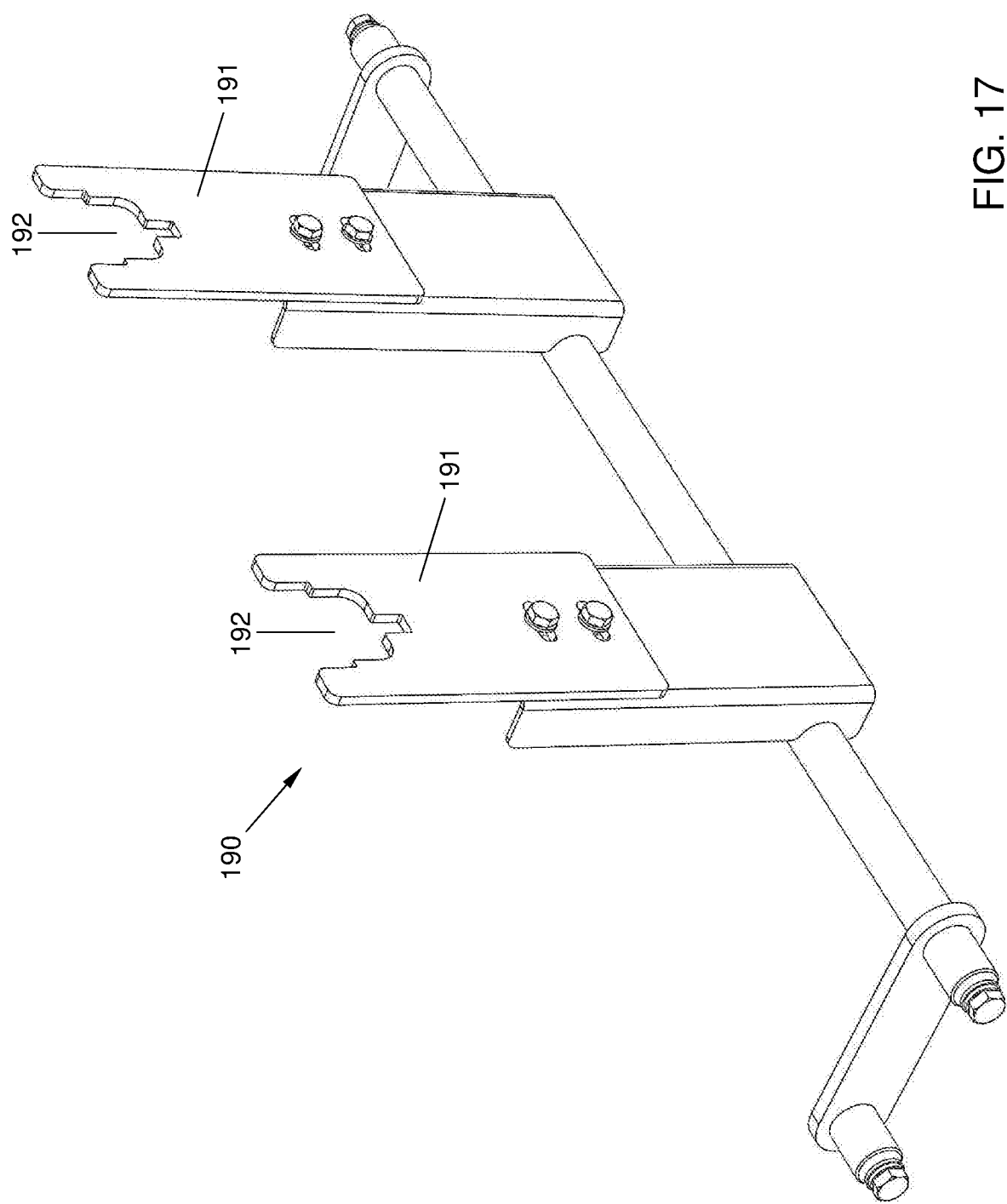
FIG. 17 is an isometric view of a double carcass unloader.

As shown by FIG. 17 the carcass unloader 190 has two parallel unloader elements 191, which only allow a carcass carrying mandrel to pass through an upper contoured recess 192. The result is that the carcass is separated from the passing mandrels and will drop down into a collecting container or the like.

While not described in great detail, beyond the mentioning of turning station 14, it is to be understood that during conveying the breast cap carrying mandrels 39 can be rotated through 90 degree increments, and in particular through 180 degrees by similar turning stations, if necessary to improve processing steps such as de-skinning or cutting.

Accordingly there is described a method and apparatus for processing poultry parts moving in succession along a path of conveyance. The method provides for an apparatus (meat processing machine 1) including at least a conveyor (endless conveyor 5) arranged to convey a succession of poultry parts (on first and second carriers 13A, 13B) moving along the path of conveyance downstream of a loading area. In the example of the invention described the meat processing machine is a machine for deboning and filleting breast caps. In breast cap filleting it can be advantageous to make use of an endless conveyor that defines an upper stretch and a lower stretch extending between first and second redirecting rollers. The upper stretch, or part thereof, can then be used as a loading area. The lower stretch conveying the breast cap carriers in an upside-down position can then be used to locate individual meat processing units. Thus the described method further includes the step of loading the poultry parts on the conveyor (5) in the loading area, while the conveyor is operated to convey the poultry parts (held on carriers 13A, 13B) in succession. Further the apparatus (1) provided by the method also includes a transfer means (57) in the path of conveyance downstream of the loading area. The transfer means (diagonal guide bar 57 for engagement by the guide rollers 27 of the second carriers 13B) is operated to divide the succession of poultry parts into at least two parallel streams. The first carriers (13A) are kept aligned in their original track, while the second carriers (13B) are moved over and aligned into another track parallel to the original track. When coincident with the at least two parallel streams or conveyance tracks the method performs at least two processing steps in a side-by-side arrangement at a downstream location along the path of conveyance. The processing steps thereby being effective to process each poultry part either identically or differently, while these are divided into the at least two parallel streams of conveyance.

It is thus believed that the operation and construction of the present invention will be apparent from the foregoing description and drawings appended thereto. For the purpose of clarity and a concise description features are described herein as part of the same or separate embodiments, however, it will be appreciated that the scope of the invention may include embodiments having combinations of all or some of the features described. References to published material or sources of information contained in the text should not be construed as concession that this material or information was part of the common general knowledge in this country or abroad. Each document, reference or patent publication cited in this text should be read and considered by the reader as part of this text, and for reasons of conciseness the contents thereof is not repeated, duplicated or copied in this text. It will be clear to the skilled person that the invention is not limited to any embodiment herein described and that modifications are possible which may be considered within the scope of the appended claims. Also kinematic inversions are considered inherently disclosed and can be within the scope of the invention. In the claims, any reference signs shall not be construed as limiting the claim. The terms 'comprise', 'comprising' and 'including' when used in this description or the appended claims should not be construed in an exclusive or exhaustive sense but rather in an inclusive sense. Thus expression as 'including' or 'comprising' as used herein does not exclude the presence of other elements, integers, additional structure or additional acts or steps in addition to those listed. Furthermore, the words 'a' and 'an' shall not be construed as limited to 'only one', but instead are used to mean 'at least one', and do not exclude a plurality. Features that are not specifically or explicitly described or claimed may additionally be included in the structure of the invention without departing from its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. To the extend that structure, material, or acts are considered to be essential they are inexpressively indicated as such. Additions, deletions, and modifications within the purview of the skilled person may generally be made without departing from the scope of the invention, as determined by the claims.

The invention claimed is:

1. Method for processing poultry parts moving in succession along a path of conveyance comprising, providing a conveyor arranged to convey a succession of poultry parts along the path of conveyance downstream of a loading area, loading the poultry parts on the conveyor in the loading area, while operating the conveyor to convey the poultry parts in succession, providing a transfer means in the path of conveyance downstream of the loading area, operating the transfer means to divide the succession of poultry parts into at least two parallel streams, and performing at least two processing steps in a side-by-side arrangement at a location downstream along the path of conveyance coinciding with the at least two parallel streams, and effective to process each poultry part, while the poultry parts are divided into the at least two parallel streams.

2. Method as in claim 1, wherein the conveyor is provided as an endless conveyor.

3. Method as in claim 1, wherein the poultry parts are supported by carriers being provided with the conveyor.

4. Method as in one of claim 1, wherein the at least two processing steps are performed simultaneously.

5. Method as in claim 1, wherein the at least two processing steps are identical.

6. Apparatus for processing poultry parts moving in succession along a processing path, the apparatus comprising a conveyor defining the processing path and arranged to convey a succession of poultry parts along the processing path, a transfer mechanism arranged to divide the succession of poultry parts into at least two parallel streams, and downstream of the transfer mechanism either at least one single processing unit capable of processing at least two side-by-side poultry parts in the at least two parallel streams or at least two identical processing units in a side-by-side arrangement to process at least two poultry parts, while the poultry parts are distributed substantially equally over the at least two parallel streams.

7. Apparatus as in claim 6, wherein the conveyor is an endless conveyor.

8. Apparatus as in claim 7, wherein the endless conveyor defines an upper stretch and a lower stretch extending between first and second redirecting rollers.

9. Apparatus as in claim 8, wherein at least one of the first and second redirecting rollers of the conveyor is driven by a motor.

10. Apparatus as in claim 8, wherein at least one of the first and second redirecting rollers comprises first and second lateral wheels.

11. Apparatus as in claim 10, wherein the first and second lateral wheels are mounted on a central shaft.

12. Apparatus as in claim 10, wherein alternating first and second carriers are each arranged on successive pairs of first and second transverse bars defining chain links of the endless conveyor, and wherein the first and second lateral wheels are notched at their circumference to engage the pairs of first and second transverse bars defining the chain links of the conveyor.

13. Apparatus as in claim 10, wherein the transfer mechanism comprises a diagonal guide bar positioned for engagement by only the second carriers, and wherein the diagonal guide bar is positioned between the first and second lateral wheels of at least one of the first and second redirecting rollers.

14. Apparatus as in claim 6, wherein the conveyor further includes a plurality of first and second carriers, each for supporting a poultry part.

15. Apparatus as in claim 14, wherein each of the first and second carriers have a base part for connection to the conveyor.

16. Apparatus as in claim 14, wherein alternating first and second carriers are each arranged on successive pairs of first and second transverse bars defining chain links of the endless conveyor.

17. Apparatus as in claim 16, wherein each base part comprises first and second transverse bores for engaging the first and second transverse bars of each pair.

18. Apparatus as in claim 6, wherein the transfer mechanism comprises a diagonal guide bar positioned for engagement by only the second carriers.

19. Apparatus as in claim 18, wherein each of the second carriers has a projecting guide roller for engaging the diagonal guide bar.

20. Apparatus as in claim 6, wherein the apparatus includes a plurality of meat processing stations for processing poultry parts distributed substantially equally over the at least two parallel streams.

21. Apparatus as in claim 20, wherein the processing of poultry parts includes filleting poultry breast caps.

22. Apparatus as in claim 21, further comprising at least one de-skinner unit downstream of the transfer mechanism.

23. Apparatus as in claim 21, further including a pair of identical wishbone removing units in a side-by-side arrangement downstream of the transfer mechanism.

24. Apparatus as in claim 21, further including a pair of identical first breast fillet removing units in a side-by-side arrangement downstream of the transfer mechanism.

25. Apparatus as in claim 21, further comprising a pair of identical breast fillet cutters in a side-by-side arrangement downstream of the transfer mechanism.

26. Apparatus as in claim 21, further comprising a pair of identical second breast fillet removing units in a side-by-side arrangement downstream of the transfer mechanism.

27. Apparatus as in claim 21, wherein at least two processing steps are performed simultaneously in each of the at least two parallel streams.

28. Apparatus as in claim 21, wherein at least two processing steps are identical for each of the at least two parallel streams.

29. A method for processing poultry parts moving in succession along a path of conveyance, the method comprising:
- obtaining a conveyor arranged to convey a succession of poultry parts along the path of conveyance downstream of a loading area;
- loading the poultry parts on the conveyor in the loading area, while operating the conveyor to convey the poultry parts in succession;
- obtaining a transfer means in the path of conveyance downstream of the loading area;
- operating the transfer means to divide the succession of poultry parts into at least two parallel streams; and
- performing at least two processing steps in a side-by-side arrangement at a location downstream along the path of conveyance coinciding with the at least two parallel streams, and effective to process each poultry part, while the poultry parts are divided into the at least two parallel streams.

* * * * *